US012390675B2

(12) United States Patent
Burgos et al.

(10) Patent No.: US 12,390,675 B2
(45) Date of Patent: Aug. 19, 2025

(54) FLAMELESS VENTING SYSTEM

(71) Applicant: BS&B INNOVATIONS LIMITED, Limerick (IE)

(72) Inventors: Jose Burgos, Bouchemaine (FR); Geoffrey Brazier, Woodbury, MN (US)

(73) Assignee: BS&B INNOVATIONS LIMITED, Limerick (IE)

(*) Notice: Subject to any disclaimer, the term of this patent is extended or adjusted under 35 U.S.C. 154(b) by 0 days.

(21) Appl. No.: 17/933,636

(22) Filed: Sep. 20, 2022

(65) Prior Publication Data

US 2024/0082615 A1 Mar. 14, 2024

Related U.S. Application Data

(63) Continuation of application No. 16/061,914, filed as application No. PCT/US2016/066404 on Dec. 13, 2016, now abandoned.

(Continued)

(30) Foreign Application Priority Data

Dec. 14, 2015 (CA) .................................... 2915307

(51) Int. Cl.
*A62C 37/36* (2006.01)
*A62C 4/00* (2006.01)

(Continued)

(52) U.S. Cl.
CPC ................ *A62C 37/36* (2013.01); *A62C 4/00* (2013.01); *B65D 90/325* (2013.01); *B65D 90/36* (2013.01)

(58) Field of Classification Search
None
See application file for complete search history.

(56) References Cited

U.S. PATENT DOCUMENTS 1,826,487 A 10/1931 Wiggins
2,247,225 A 6/1941 Edwards (Continued)

FOREIGN PATENT DOCUMENTS

DE 102012104763 A1 * 12/2013 ............ A62C 3/065
EP 0066023 A1 * 12/1982
EP 0530945 A1 3/1993

OTHER PUBLICATIONS

Office Action issued from Mexican Patent Office on Apr. 26, 2022 in Mexican Patent Application No. MX/a/2018/007171.

*Primary Examiner* — Angelisa L. Hicks
(74) *Attorney, Agent, or Firm* — Finnegan, Henderson, Farabow, Garrett & Dunner LLP

(57) ABSTRACT

The disclosure relates to a flameless venting system, along with associated devices and methods. In one aspect, the disclosure is directed to a flameless venting system having a curved flange, which may allow the system to mount directly to the curved surface of a vessel. In another aspect, a disclosed flameless venting system has a curved filter exit. In still another aspect, a disclosed flameless venting system may be configured such that a flame-arresting quenching body component may be joined to a vessel prior to installation of an explosion panel component. In addition, a quenching body component may be configured to provide access to its interior, to facilitate inspection, replacement, or maintenance of an explosion panel contained therein.

15 Claims, 15 Drawing Sheets

Related U.S. Application Data

(60) Provisional application No. 62/267,084, filed on Dec. 14, 2015.

(51) Int. Cl.

| | |
|---|---|
| ***B65D 90/32*** | (2006.01) |
| ***B65D 90/36*** | (2006.01) |

(56) References Cited

U.S. PATENT DOCUMENTS

| | | | | | |
|---|---|---|---|---|---|
| 2,388,395 | A | | 11/1945 | Duggan | |
| 3,927,555 | A | | 12/1975 | Godwin | |
| 4,270,560 | A | * | 6/1981 | Kearney | F16K 17/16<br>137/557 |
| 4,444,214 | A | | 4/1984 | Paul, Jr. | |
| 4,484,690 | A | * | 11/1984 | Nash | H05K 5/06<br>55/491 |
| 4,818,218 | A | * | 4/1989 | Gest | F23C 3/00<br>431/9 |
| 6,811,122 | B2 | * | 11/2004 | Aramburu | B64D 41/00<br>244/131 |
| 2004/0107823 | A1 | | 6/2004 | Kiley | |

* cited by examiner

300

300

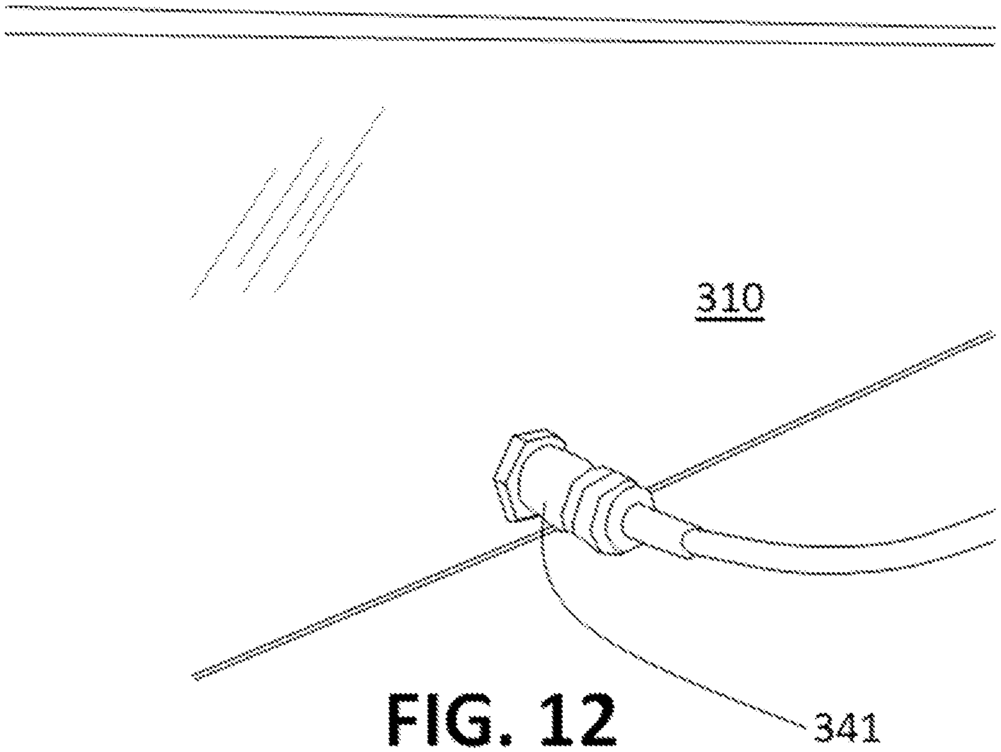
FIG. 12
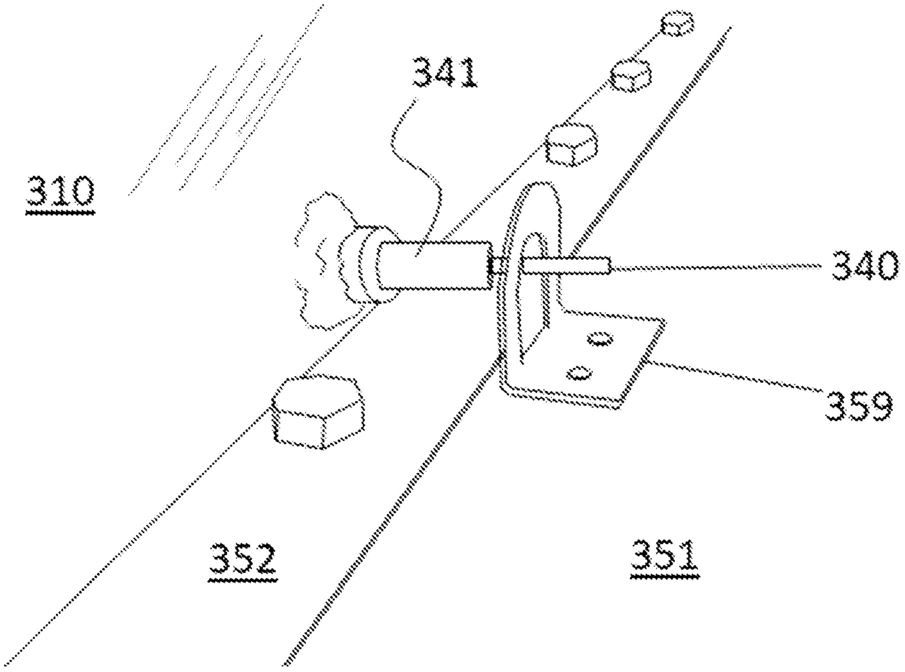

FLAMELESS VENTING SYSTEM

CROSS-REFERENCE TO RELATED PATENT APPLICATIONS

This is a continuation of U.S. Nonprovisional application Ser. No. 16/061,914, filed Jun. 13, 2018, which is a National Phase of International Application No. PCT/US2016/066404, filed Dec. 13, 2016, which claims the benefit of U.S. Provisional Application No. 62,267,084, filed Dec. 14, 2014, and Canadian Application No. 2915307, filed Dec. 14, 2014. The entire contents of the above-referenced applications are expressly incorporated herein by reference.

FIELD OF THE DISCLOSURE

This disclosure generally relates to a flameless venting system for a protected volume within a vessel, building structure, piping or duct system, or other enclosed processes.

BACKGROUND

A fire or explosion can result from ignition of a combustible material, such as dust, gas, or vapor, when mixed with oxygen present in the environment. When such ignition takes place within a protected volume contained by a vessel, such as a process or storage enclosure, the rapid rise in pressure developed may exert destructive forces within a few milliseconds, which may place both personnel and equipment at risk.

A number of industries may face the danger of ignition in an enclosed system or building structure, including plastics, food and dairy, pigments and dyes, wood processing, grain processing, coal processing, pharmaceuticals, grain ethanol, chemicals, metals, and agrochemicals. Within and/or beyond those industries, particular applications may pose the danger of such ignition. For example, cyclones, bag houses, cartridge filters, pneumatic conveying systems, milling processes (including pin milling, ball milling, etc.), bucket elevators, dust collectors, bins, dryers, ovens, roller mills, grinding applications, and buildings may all pose the danger of ignition causing fire or explosion.

The destructive forces associated with a fire or explosion may take the form of a detonation (i.e., an expanding flame ball that proceeds at a speed in excess of the speed of sound in air) or a deflagration (i.e., an expanding flame ball that proceeds below the speed of sound in air).

Most materials handling, processing, and storage equipment is not designed to resist the pressure of an explosion. To survive a deflagration, for example, processing and storage equipment typically must be designed to resist the maximum pressure ($P_{max}$) developed by the combustion process. Such design may be prohibitively expensive, however, because $P_{max}$ may exceed 75 psig (5.2 bar) in typical cases. Therefore, to address combustion, a process or storage enclosure may be provided with a system to allow pressure and/or a flame from an explosion to escape the enclosure.

An explosion venting system provides an explosion vent as part of the process, building, piping, ducting or storage enclosure. The explosion vent may include an explosion panel, burst panel, rupture disk, or other pressure-release mechanism.

Combustion within the enclosure may create an increased pressure (i.e., overpressure), which in turn can lead to opening of the explosion vent. When an explosion vent opens, a flame ball may be released from the enclosure. The flame ball may be released directly to the atmosphere.

Alternatively, if the explosion vent is deployed within a building or structure, a duct may be used to direct the flame ball away from the enclosure, e.g., to the exterior of the building or structure. An explosion venting system may do little to mitigate a flame of a flame ball, and may still result in a pressure wave resulting from combustion, or particulates resulting from the combustion.

A flame arrestor system may be provided as part of the process or storage enclosure. A flame arrestor may comprise a filter component such as a coiled-ribbon-type mesh, woven metallic mesh, or ceramic matrix, which is designed to provide a series of small flow paths through the flame arrestor's structure. When the flame passes through the small flow paths of the filter, it tends to be suppressed or extinguished as the heat is absorbed by the filter material and the combustion process is momentarily starved of oxygen. A flame arrestor is typically deployed in a combustible gas or vapor application, although the extinguishing of flame also may be effective with combustible dusts, mists, and vapors. A flame arrestor may provide effective mitigation of a flame, thereby acting as a barrier to the flame's progress.

A flameless venting system provides a combination of an explosion vent and a quenching module (which may be a flame arrestor or include a flame arrestor), and is designed to absorb a flame ball arising from the combustion of a dust, gas, vapor, mist, or combination thereof. Depending on the design of the flameless venting device, it may mitigate the flame ball, reduce a pressure pulse emitted by the combustion, and absorb some or all of the particulates arising from, e.g., a combustible dust explosion. Thus, a flameless venting system may be particularly desired in circumstances in which an ejected flame ball or ejected particulates are unacceptable. For example, flameless venting systems may be particularly suited to installation in confined indoor spaces where personnel may be in the vicinity, or where secondary risks of combustion are present.

A flameless venting system may be a round system (as might be used with a circular vent) or a rectangular system (as might be used with a rectangular vent). In general, round devices are conducive to a large ratio between vent area and flame-arresting area (typically greater than 5:1), which makes round devices superior for dust absorption. Round devices include, e.g., the IQR™ device of BS&B Safety Systems. Also in general, rectangular devices have a smaller ratio between vent area and flame arresting area (typically greater than 2:1), which typically makes their dust-absorption more limited. Rectangular devices include, e.g., the R-IQR™ device of BS&B Safety Systems.

In some applications, a flameless venting system may be mounted on a curved surface, such as the cylindrical surface of a storage silo or the cylindrical surface of a round-body dust collector. Known flameless venting systems require using an adapter to transition from such curved surfaces to the flat-flanged mounting arrangement of a known flameless venting system. In other words, known flameless venting systems cannot mount directly to a curved surface. Using an adapter to mount a flameless venting system is often inconvenient or undesirable. The adapter may add cost, weight, and/or size to the flameless venting system. Additionally, the adapter may add a ledge, a corner, or some other geometrical complexities that may attract contamination and/or may otherwise be difficult to clean. In "clean product" industries, such as the food industry and pharmaceutical industry, it is desirable to avoid or eliminate any such opportunities for contamination.

In a known system using a flameless venting system, an explosion vent is first installed on a vessel containing a protected volume. A flame arrestor component is then positioned and installed over the explosion vent, perhaps as part of a quenching module. Such known systems present significant drawbacks in installation. For example, an explosion vent is typically made of a relatively light-gauge material (e.g., from 0.020-inch to 0.080-inch or 0.5-mm to 2.0-mm thick), and is carefully calibrated to open in response to a particular pressure differential. A flame arrestor component and/or quenching module is much heavier by comparison. For example, a quenching module/flame arrestor component of a flameless venting device is typically a fabricated structure made of sheet metal and angled metal of typical thickness between 0.080-inch to 0.250-inch, or 2.0-mm to 6.5-mm, which results in a mass perhaps an order of magnitude (or more) greater than the mass of the explosion vent. As one example, the combined weight of a flameless venting system (i.e., an explosion vent and flame arrestor) may exceed 200 pounds or 90 kg, whereas the weight of an explosion vent alone may be around 20 pounds or 9 kg. During installation of a known flameless venting system, the relatively lightweight vent must be held in place gently while the heavy arrestor mechanism and/or quenching module are mounted above the vent and the whole arrangement is bolted to a vessel containing a protected volume. Often, such flameless venting systems are installed on substantially vertical surfaces (e.g., the side wall of a silo), and/or on a surface that is difficult to access. As such, the installation process is difficult and presents the risk that the heavy arrestor mechanism may damage the relatively delicate (and often carefully calibrated) explosion vent.

A known flameless venting system also presents difficulties in inspection and maintenance. Applicable codes and standards require components (e.g., explosion vents and flame-arrestor filters) to be inspected periodically. In a known system, such inspection typically requires removal of the flame arrestor (a process that may necessitate full replacement of the explosion vent) or requires an inspector to enter the protected volume to inspect the explosion vent from the process side. Inspection from the process side may be difficult, particularly if the vent is positioned in a difficult-to-access part of the process. Also, inspection from the process side may be undesirable, to the extent that inspection creates the risk of an inspector contaminating or damaging the protected volume. Also in known flameless venting systems, the flame-arrestor filter may only be inspected externally, because the interior of the flame arrestor is inaccessible. Further, in a known flameless venting system, the explosion vent may only be replaced via removal of the flame arrestor—i.e., it is not possible to replace the explosion vent while the heavy flame arrestor or quenching module remains mounted in position on the protected enclosure.

In view of the foregoing, it may be desirable to provide a flameless venting system that may mount directly onto a curved surface without an adapter. It also may be desirable to provide a flameless venting system in which a flame arrestor may be mounted on a vessel more easily, and/or such a system in which an explosion vent or other flameless venting system components may be installed, inspected, and maintained more easily (e.g., without removing the flame arrestor).

The disclosure herein provides a device, system and associated methods that may achieve one or more advantages over the known devices, systems and methods in the art, including such art described above.

BRIEF DESCRIPTION OF THE DRAWINGS

The accompanying drawings, which are incorporated in and constitute a part of this specification, illustrate several embodiments and together with the description, serve to explain principles of the disclosure.

FIG. 12 is a partial perspective view of a flameless venting system, illustrating a sensor mount.

FIG. 13 is a partial perspective view of a flameless venting system, illustrating a sensor mount.

DESCRIPTION OF THE EMBODIMENTS

Reference will now be made in detail to the present exemplary embodiments, examples of which are illustrated in the accompanying figures.

Figure 1:
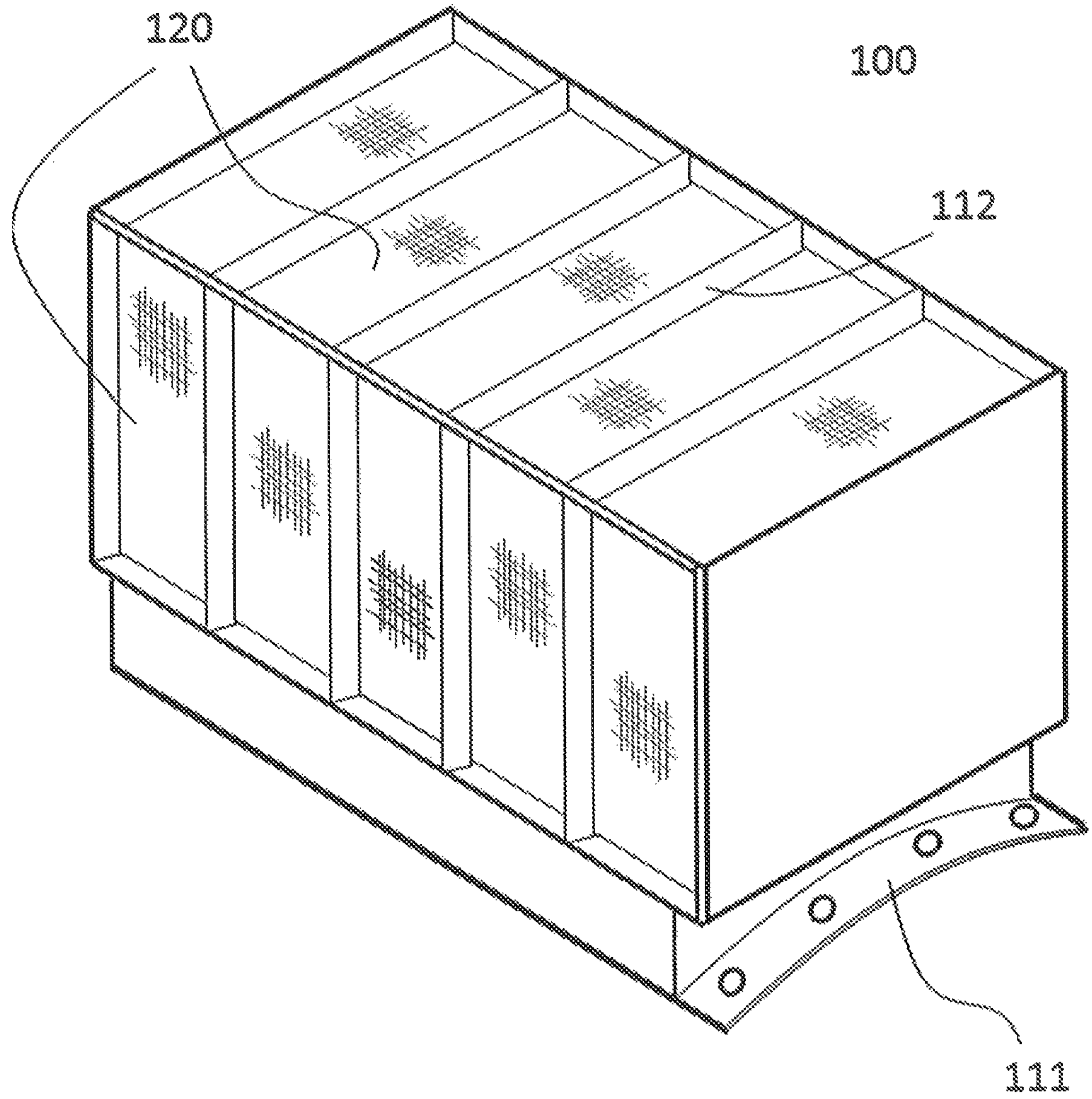
FIG. 1 is a perspective view of a flameless venting system having a curved mounting flange.

FIG. 1 illustrates a flameless venting system 100, which includes a filter 120 retained in place by way of supports 112. The flameless venting system 100 includes a mounting flange 111, which is configured to mount on a vessel containing a protected volume. As illustrated, the mounting flange 111 is curved, which allows the flange 111 to mount to a curved vessel surface, such as the surface of a cylindrical silo, dust collector, or dust bin.

In use, an explosion vent within the flameless venting system 100 may be positioned over an opening in the vessel containing a protected volume, and the explosion vent and/or flameless venting system 100 may be secured to the vessel via mounting flange 111. A gasket (not shown) may be provided between the flange 111 and a mated flange of the vessel (not shown). The explosion vent may be configured to burst in the event of an explosion within the protected volume, which will allow a pressure wave, propagating flame, gases, and/or debris (as applicable) to escape into the interior of the flameless venting system 100 to be absorbed or retained by the filter 120 to prevent or reduce one or more of the pressure wave, propagating flame, gases, and/or debris from escaping the system into the environment.

Because the mounting flange 111 is curved, the embodiment of FIG. 1 may allow direct mounting to the curved surface of a vessel containing a protected volume—i.e., without the need for an adapter to transition from the curved vessel surface to a flat (non-curved) flange of a flameless venting system. By eliminating the need for an adapter, the flameless venting system 100 may increase convenience, and may decrease the cost, weight, and/or size associated with using such an adapter. In addition, by eliminating the need for an adapter, the flameless venting system 100 may avoid creating a ledge, a corner, or other such geometrical complexity that may attract contamination and/or may otherwise be difficult to clean. Thus, the flameless venting system 100 of FIG. 1 may be particularly suited for use in the food or pharmaceutical industries, or other industries in which it is desirable to avoid or eliminate opportunities for contamination.

Figure 2:
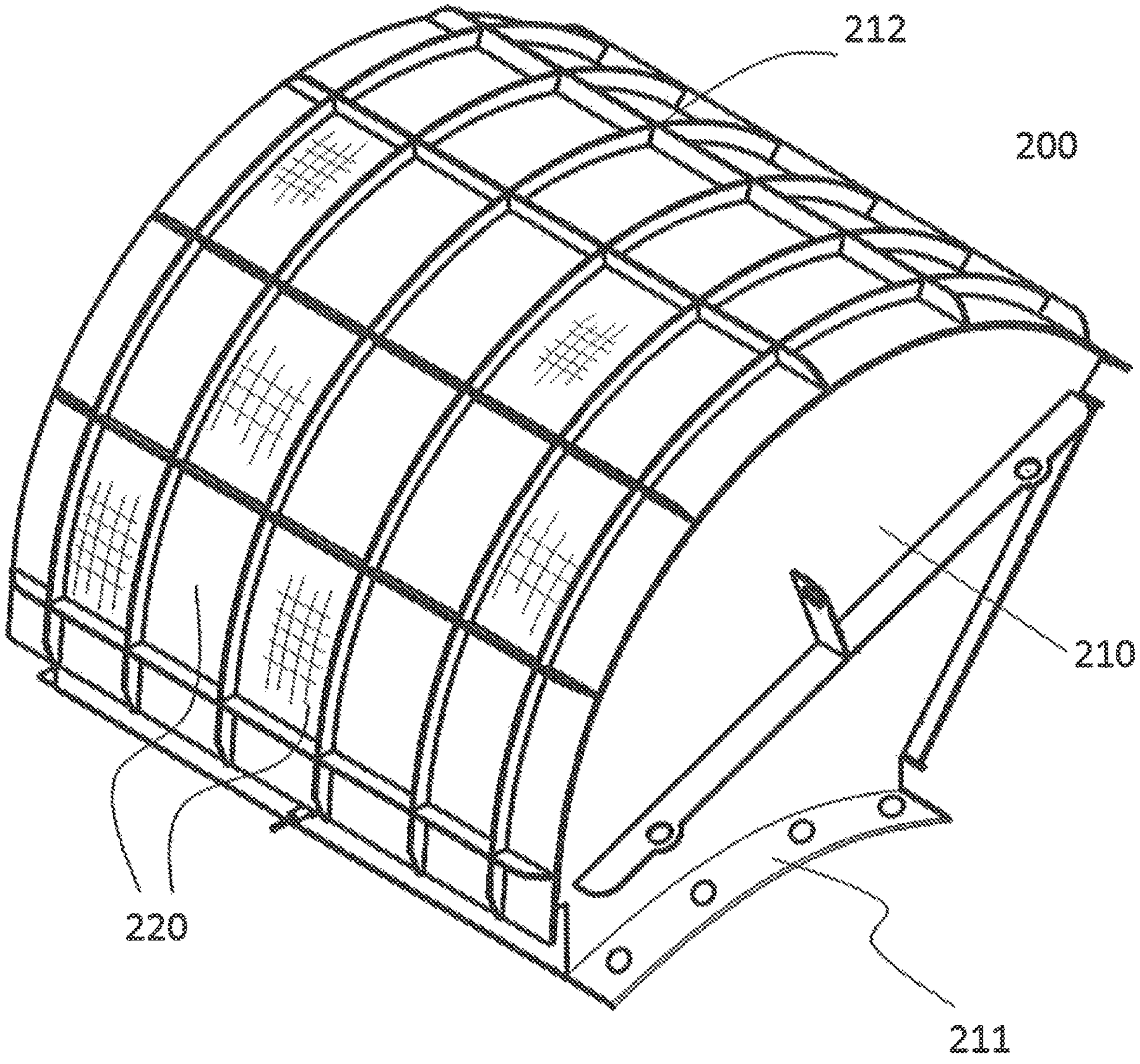
FIG. 2 is a perspective view of another flameless venting system having a curved mounting flange.

FIG. 2 illustrates another embodiment of a flameless venting system 200 according to the present disclosure. As illustrated, a flameless venting system 200, may include a filter 220, which may be retained using one or more supports 212. The flameless venting system 200 may include a mounting flange 211, which may be configured to mount on a vessel containing a protected volume. As illustrated, the mounting flange 211 may be curved, which may allow the flange 211 to mount to a curved vessel surface, such as the surface of a cylindrical silo or dust bin. A flameless venting system 200 may eliminate the need for an adapter, in a manner similar to that described above in connection with system 100. A flameless venting system 200 may operate in conjunction with an explosion vent, in a manner similar to that described above in connection with system 100.

Although the embodiments in FIG. 1 and FIG. 2 are described as being used with an explosion vent, the disclosure is not limited to such configurations. For example, a flameless venting system 100 or 200 may be used in conjunction with a burst panel, rupture disk, or other mechanism configured to release pressure, gas, debris, or flame from a protected volume in the event of an explosion. A flameless venting system 100 or 200 also may be used over a simply open orifice. In addition, although the embodiments in FIG. 1 and FIG. 2 are illustrated with a rectangular interface between the flameless venting system 100 or 200 and a vessel containing a protected volume, it is contemplated that other shapes of interface may be used. For example, a flameless venting system may have a trapezoidal, round, or circular interface, which may be suitable, e.g., for use with a trapezoidal, round, or circular explosion vent. Indeed, it is contemplated that a flameless venting system may be shaped for use with any shape of explosion vent (including asymmetrical or otherwise irregularly-shaped vents).

Figure 3:
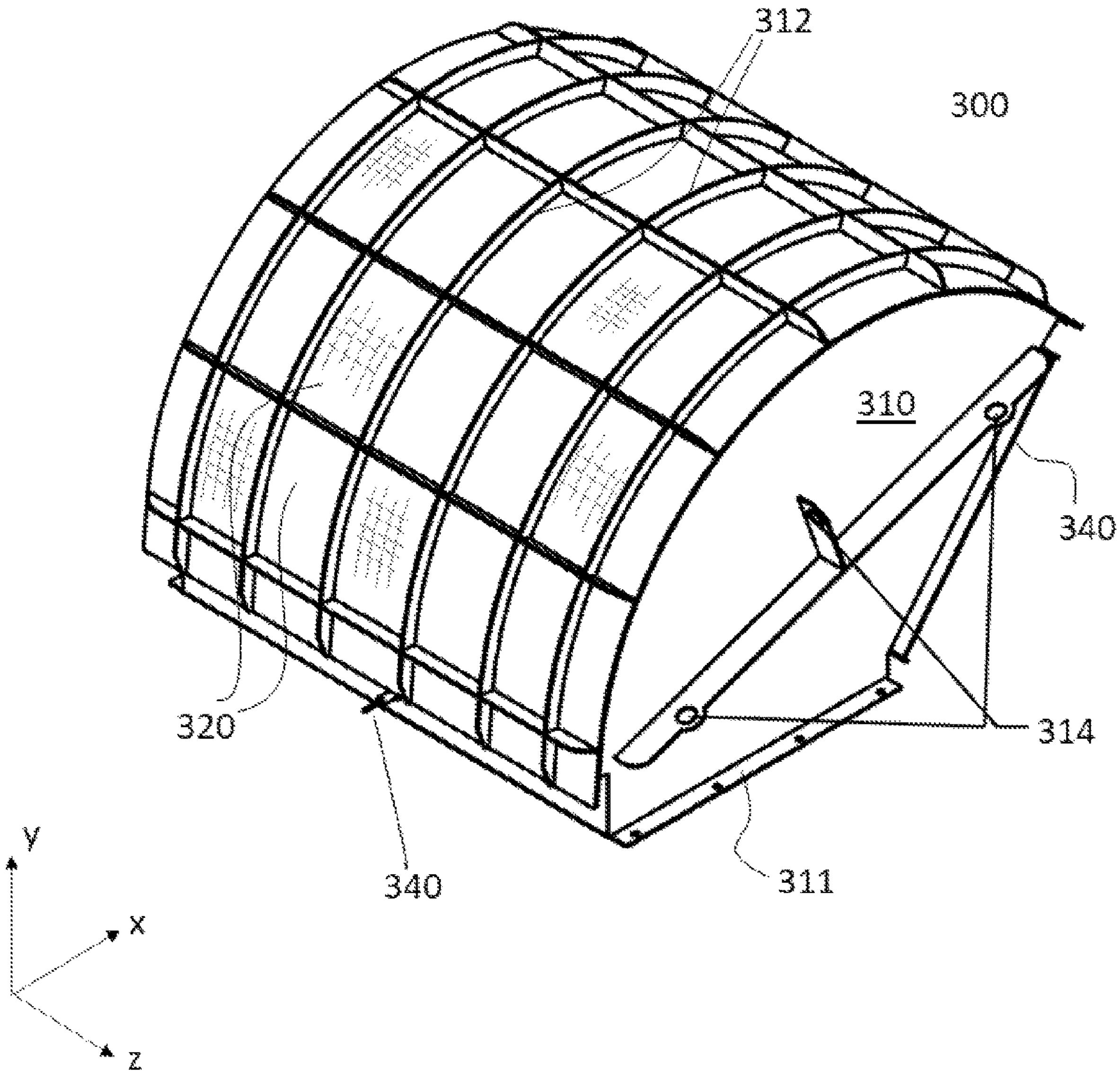
FIG. 3 is a perspective view of another flameless venting system having a curved outlet.

FIG. 3 illustrates another embodiment of the disclosure. In FIG. 3, a flameless venting system 300 is provided with a quenching module having a body 310. A flange 311 may be provided for mounting the flameless venting system onto a vessel housing a protected volume. An outlet of the body 310 may be covered with a filter 320, which may be, e.g., coiled-ribbon-type mesh, woven metallic mesh, or ceramic matrix, which may be designed to provide multiple small flow paths through the quenching module body 310. The filter 320 may be supported by way of one or more supports 312, and the filter 320 and/or supports 312 may be mounted on the outlet of the body 310 by way of bolts, clamps, welding, adhesives, or other suitable mechanisms. In one embodiment, it may be advantageous to mount the filter 320 and/or supports 312 via non-permanent means (e.g., bolts or clamps) to allow removal and replacement of the filter 320 and/or supports 312 independent from the body 310. The body 310 also may be provided with lifting lugs 314, which may be used to lift the system 300 into place for installation. The body 310 also may have a rear hatch 330, which may provide access to the interior of the system 300 when the hatch is removed. The body 310 also may include a mount for a sensor 340, which is discussed in more detail below in connection with FIG. 4A.

The rear hatch 330 may allow inspection of the vent without removal of the full flameless venting system 300 and quenching module body 310 from service. For example, a rear hatch 330 opening may allow periodic inspections in compliance with NFPA 68 or other applicable codes or requirements. During operation, the hatch 330 may be closed using a door, as illustrated. Other hatch closures are contemplated, including heat shields, mesh, or other suitable barrier to limit egress of heat, flame, dust, or other materials through the hatch. Covering the hatch in such a manner may provide safety for the system and operators. Additionally, covering the hatch may force escaping heat, flame, dust, or other materials toward the filter 320 of the quenching module, so that the filter may absorb or retain the heat, flame, dust, or other materials as needed.

Figure 4B:
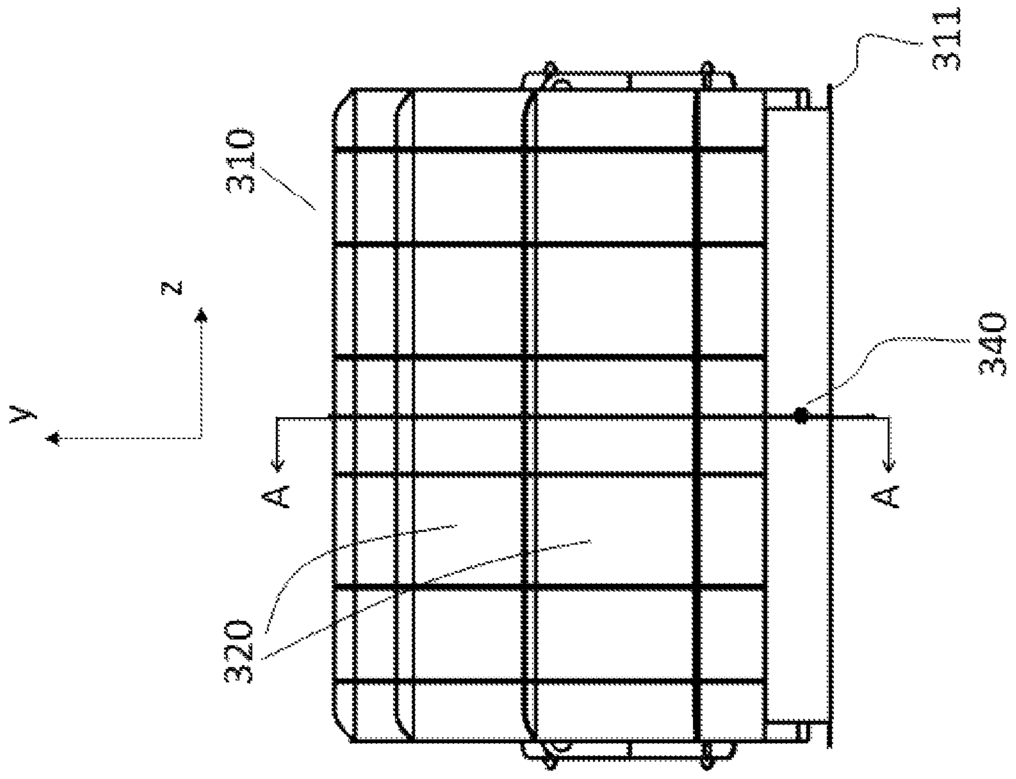
FIG. 4B is a front view of the flameless venting system of FIG. 3, showing line A-A along which the cross-section of FIG. 4A is shown.
Figure 4A:
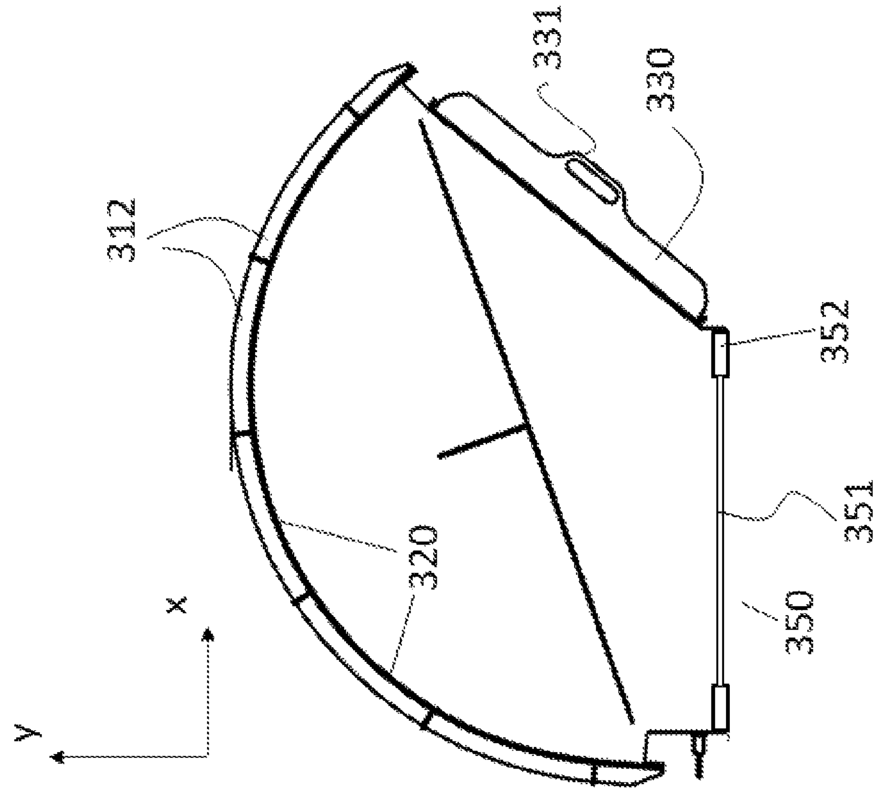
FIG. 4A is a cross-sectional view of the flameless venting system of FIG. 3.

FIG. 4A and FIG. 4B provide additional views of the flameless venting system 300. FIG. 4B depicts the system 300 viewed from the outlet side of the body 310. FIG. 4A depicts a cross-sectional view taken along line A-A of FIG. 4B. As illustrated in FIG. 4A, the flameless venting system 300 may have an arc-shaped outlet covered by the arc-shaped filter 320 and supports 312. FIG. 4A further illustrates the hatch 330 covering the rear of the body 310, as well as a handle 331, which may be used to manipulate the hatch 330 to open or close the rear of the body 310.

As illustrated in FIG. 4A, an explosion vent 350 may be provided within the flameless venting system 300. The explosion vent may include a flange 352, which may be joined to a mated flange of a vessel (not shown) or to a mated flange of a flameless venting system. The explosion vent also may include a panel 351, which may be configured to open in response to an explosion within the vessel. Sensor 340 may detect the opening of the panel 351, and may send a notification signal to notify a control system or an operator that the panel 351 has opened. The signal sent by sensor 340 may be used, e.g., to sound an alarm and/or to shut down a process contained within the vessel. It may be important to arrest the distribution of combustible fuel within and to the protected enclosure in the event of a deflagration or detonation. Thus, the sensor may provide an automatic response to a control system to arrest such distribution.

Figure 5:
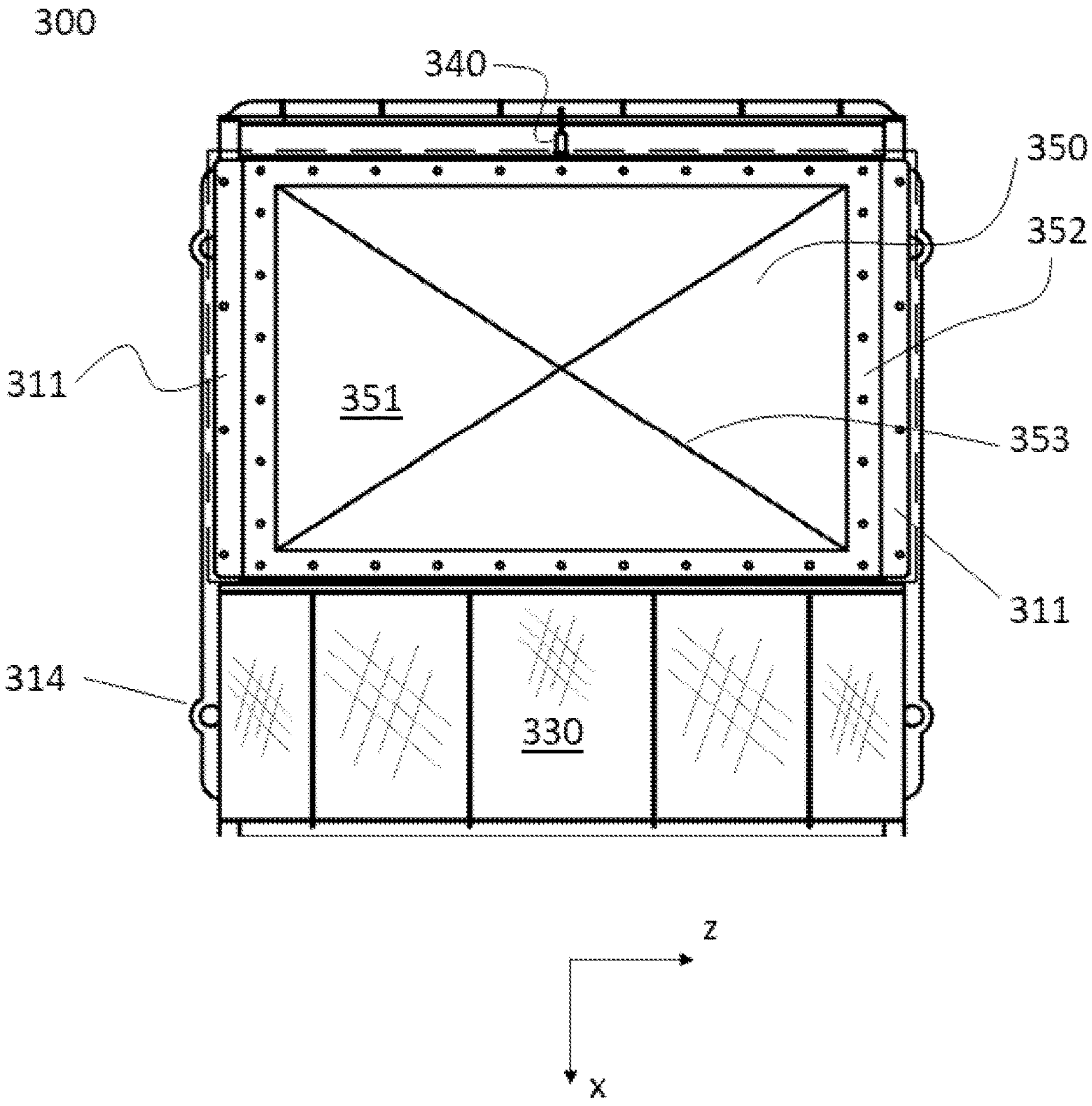
FIG. 5 is a bottom-up view of the flameless venting system of FIG. 3, showing an explosion vent within the flameless venting system.

FIG. 5 illustrates a view of the flameless venting system 300 from the bottom up (as oriented in FIG. 4A and FIG. 4B), to show details of the explosion vent 350 and rear hatch 330. As illustrated in FIG. 5, an explosion vent panel 351 may be provided with lines of weakness 353, which may be used to control an opening pattern of the panel 351 and/or to control the pressure differential at which the panel 351 will open. FIG. 5 also illustrates the mounting flange 311 of the body 310. As illustrated, the mounting flange 311 may be positioned on the exterior of the quenching module body 310—i.e., extending outwardly away from the explosion panel 351 inside the system 300. In another embodiment, a mounting flange may extend inwardly toward the interior of the quenching module body—i.e., toward an explosion panel inside the system. In such a configuration, the flange of the explosion panel may overlap and mate with the flange of the body, or the flange of the explosion panel may be located inward of the flange of the body, such that the panel flange and body flange may be adjacent in the same plane, but not overlapping. As illustrated in FIG. 5, the mounting flange 311 extends only partially around a perimeter of the quenching module body inlet—e.g., the mounting flange 311 extends along two of four edges of the rectangular perimeter of the quenching module body inlet. It is contemplated that in some embodiments, the mounting flange may extend completely around the perimeter of a quenching module inlet. Further embodiments may deploy an explosion vent that does not require a mounting flange at its outlet side.

Figure 6:
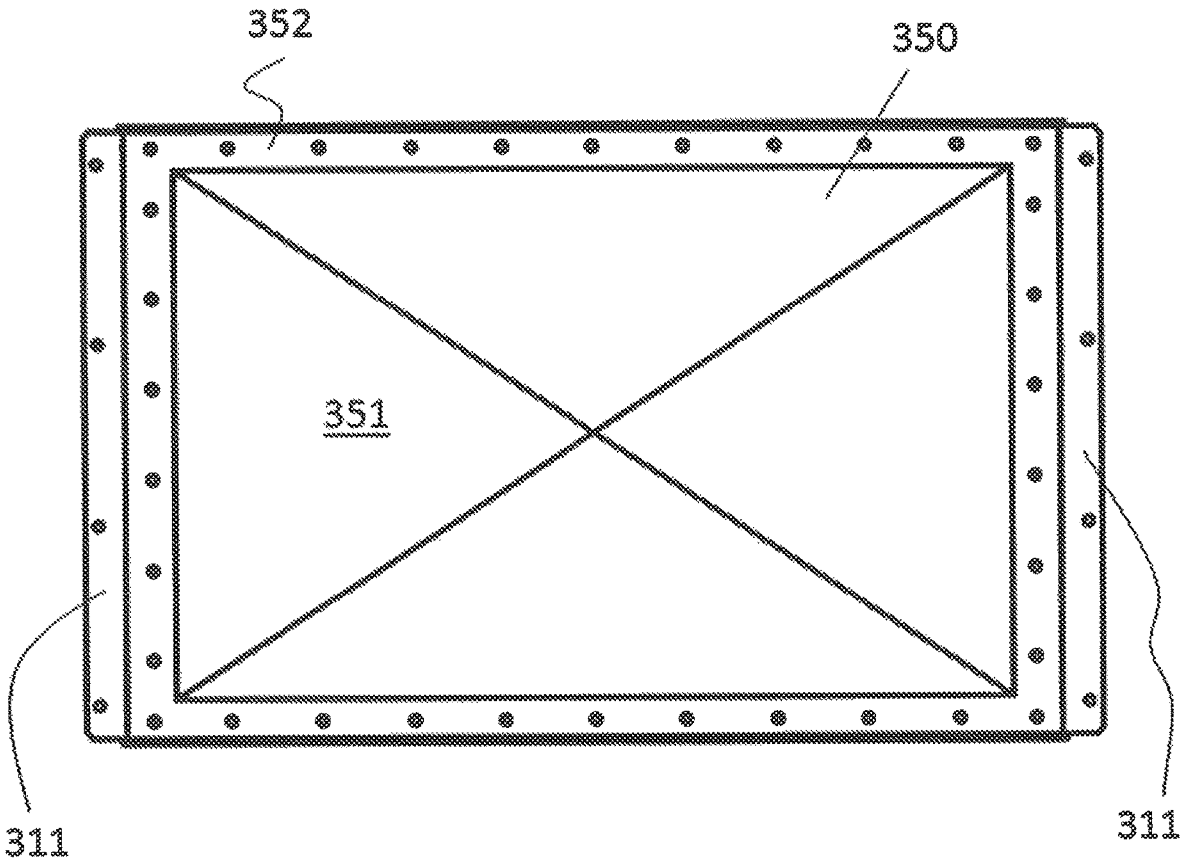
FIG. 6 is an illustration of the explosion vent and mounting flanges of the flameless venting system of FIG. 3.
Figure 15:
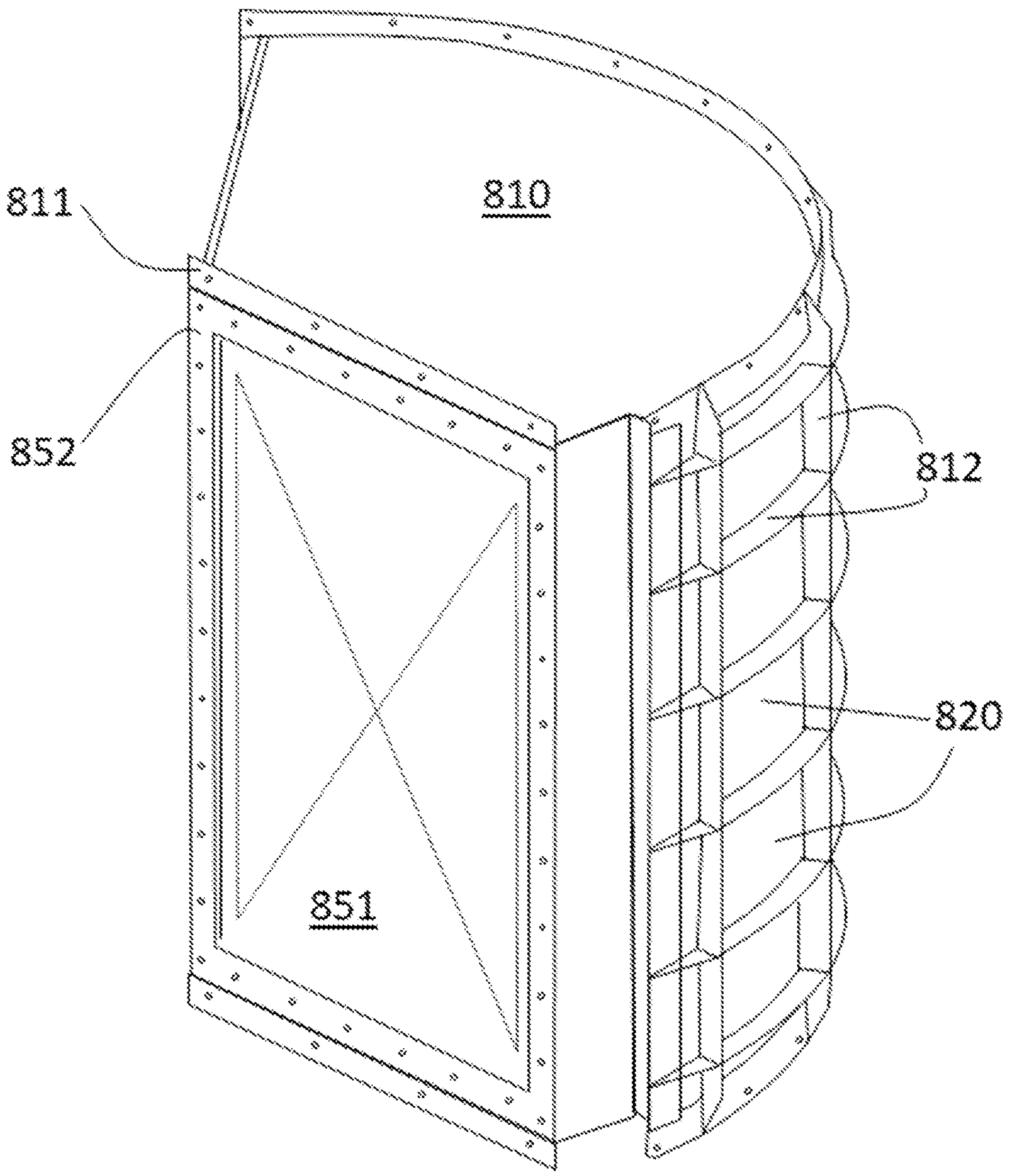
FIG. 15 is a perspective view of a flameless venting system, illustrating an explosion vent.

Additional detail of the relationship between the body flange 311 and explosion panel flange 352 is provided in FIG. 6. Additionally, FIG. 15 provides another view of the flanges of another embodiment. FIG. 15, illustrates a flameless venting system with a quenching module having a body 810, similar to the configuration illustrated in FIG. 3. A flange 811 may be provided for mounting the flameless venting system into a vessel housing a protected volume. An outlet of the body 810 may be covered with a filter 820, which may be supported by way of one or more supports 812. An explosion vent panel 851 having a panel flange 852 also is provided.

The disclosed flameless venting system may be provided to fit a vessel outlet of any suitable size. By way of non-limiting example, the disclosed system may be configured to fit an outlet of 920 mm×586 mm, 610 mm×610 mm, 490 mm×590 mm, 350 mm×650 mm, 305 mm×610 mm, 300 mm×500 mm, 270 mm×458 mm, or 170 mm×470 mm. In addition, an embodiment of the disclosed system may be deployed with a non-rectangular (e.g., circular or round) interface, which may be suitable for use with a circular or round explosion vent, or an irregular shape to suit specific application constraints.

The disclosed flameless venting system may be used with any suitable explosion vent. As one example, a quenching module may be deployed with a Vent-Saf Plus™ ("VSP") vent of the type sold by BS&B Safety Systems, including VSP-L and VSP-D type vents. More specifically, a flameless venting system according to the present disclosure has been tested using a 0.75 psi (5171 Pa) vacuum-resistant VSP-L vent. Another system according to the present disclosure has been tested using a 2.9 psi (19,995 Pa) vacuum-resistant VSP-D vent. The typical nominal set pressure of exemplary explosion vents tested with one embodiment of a flameless venting system is 0.1 bar, but additional set pressures are contemplated. For example, set pressures may be below or above 0.1 bar.

Although an explosion vent is described above, the disclosure is not limited to such configurations. For example, a flameless venting system 300 may be used in conjunction with a burst panel, rupture disk, or other mechanism configured to release pressure, gas, debris, or flame from a protected volume in the event of an explosion.

Figure 7B:
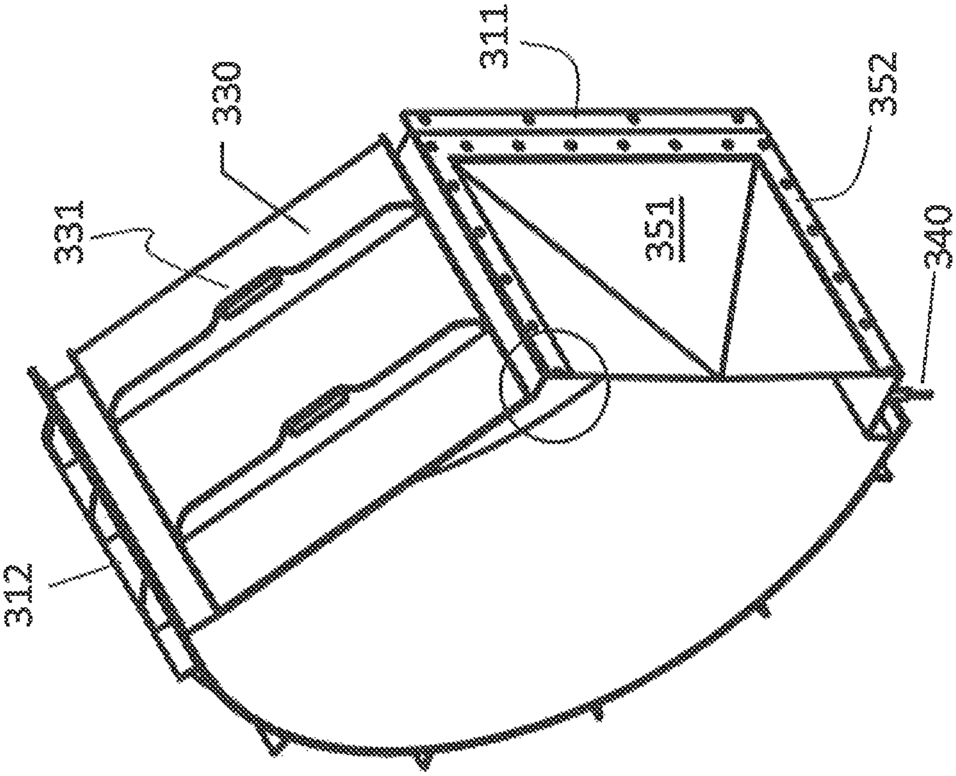
FIG. 7B is a cross-sectional perspective view of the flameless venting system of FIG. 3, further showing the location of the detail perspective view in FIG. 7A.
Figure 7A:
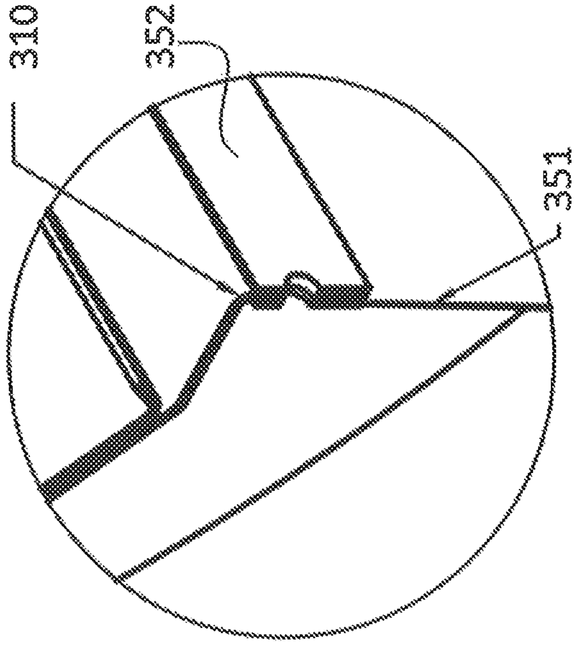
FIG. 7A is a detail perspective view of the flameless venting system of FIG. 3.

FIG. 7A and FIG. 7B illustrate additional views of the flameless venting system 300. FIG. 7B illustrates a perspective cross-sectional view of the system 300 along line A-A in FIG. 4B. FIG. 7B illustrates the rear hatch 330 and handles 331 on the rear of the body 310. FIG. 7A provides a detailed view of section CB' of FIG. 7B. Specifically, FIG. 7A illustrates the positional relationship between the explosion vent (having flange 352 and panel 351) and the body 310. As shown, the explosion vent may extend across substantially the entire opening of the body 310, such that the exterior perimeter of the explosion vent flange 352 closely follows the interior perimeter of the inlet of body 310. Alternatively, an explosion vent may cover less than the entire opening of the body 310.

Figure 8:
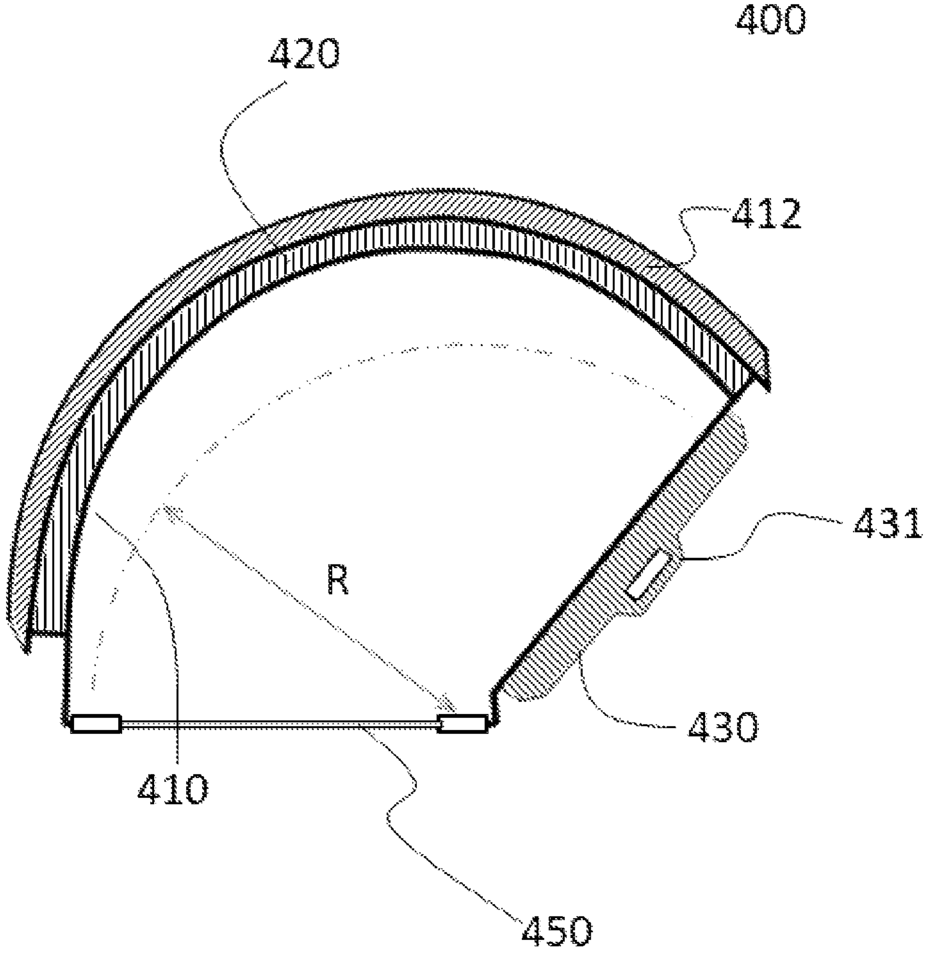
FIG. 8 is a cross-sectional view of another embodiment of a flameless venting system.

Whereas FIG. 4A depicts a flameless venting system 300 with an outlet having a substantially circular arc, it is contemplated that an outlet may have different cross-sectional geometries. For example, in FIG. 8, depicts a cross-sectional view of another flameless venting system 400. As illustrated, an explosion vent 450 is positioned within a quenching module body 410. The body 410 has a rear hatch 430, with a handle 431, covering the rear of the body. An outlet of the body 410 is covered with a filter 420 supported by supports 412. In cross-section, the outlet of the body 410 bulges outward in the center, giving the outlet an elliptical arc shape. In other words, the radius (R) from the rear of the explosion vent 450 to the filter 420 is greater toward the center of the filter 420 and smaller toward the front and rear of the filter 420.

A curved outlet (such as depicted in FIG. 4A and FIG. 8) may extend across, e.g., 135 degrees of a circle. Curved outlets of other arc lengths (e.g., greater than or less than 135 degrees) also are contemplated. Using a curved outlet may provide advantages, in that the filter 320 or 420 has a greater surface area than the cross-sectional area of the vent. For example, the filter area may be double the vent area. By increasing the ratio of filter area to vent area, the efficiency of the entire flameless venting device may be increased. Furthermore, a curved outlet of a quenching module body, along with a filter curved to follow the curve of the outlet, may permit over-rotation of a single section vent, to give a clear deflagration path, enhancing the efficiency of the entire flameless venting device by keeping the open vent substantially out of the combustion flow path.

Figure 9A:
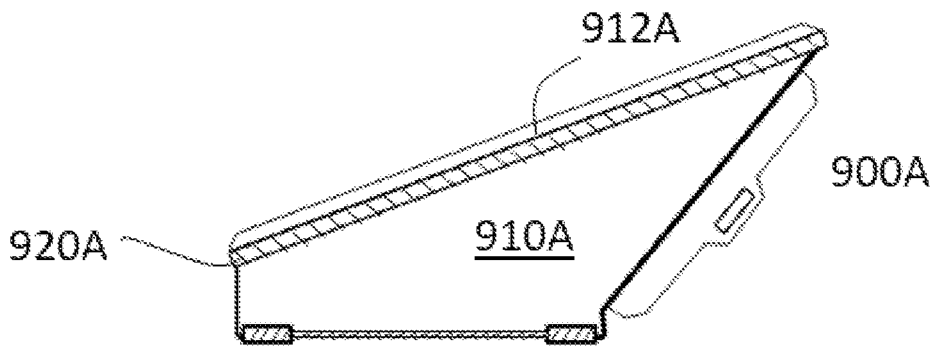
FIGS. 9A and 9B are cross-sectional views of still other embodiments of a flameless venting system.
Figure 9B:
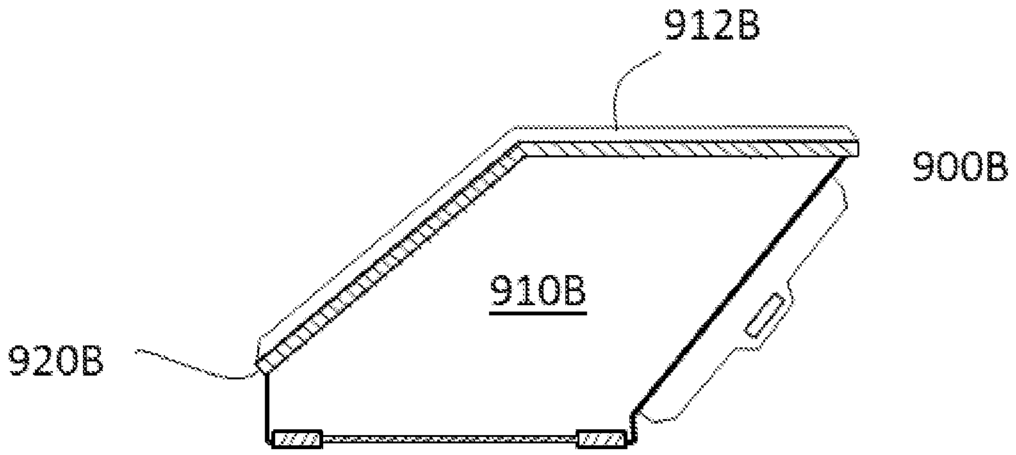

Although FIG. 4A and FIG. 8 both depict essentially curved flameless venting system outlet filters, the disclosure is not limited to such configurations. For example, it is contemplated that the outlet of a flameless venting system may be flat, as illustrated in FIG. 9A or may be provided with one or more angles, as illustrated in FIG. 9B. In FIG. 9A, a venting module 900A has a body 910A, along with a filter 920A supported by supports 912A. In FIG. 9B, a venting module 900B has a body 910B, along with a filter 920B supported by supports 912B. Although the increased surface area of a rounded outlet filter (as in systems 300 and 400) may be desired in some applications to maximize vent efficiencies, it may be adequate in some applications to use a flat or angled system such as illustrated in FIGS. 9A and 9B. For example, using a flat or angled system may be more cost-effective or may better fit the area surrounding the flameless venting system, such that any decreases in venting efficiency are sufficiently outweighed by those advantages.

Figure 10:
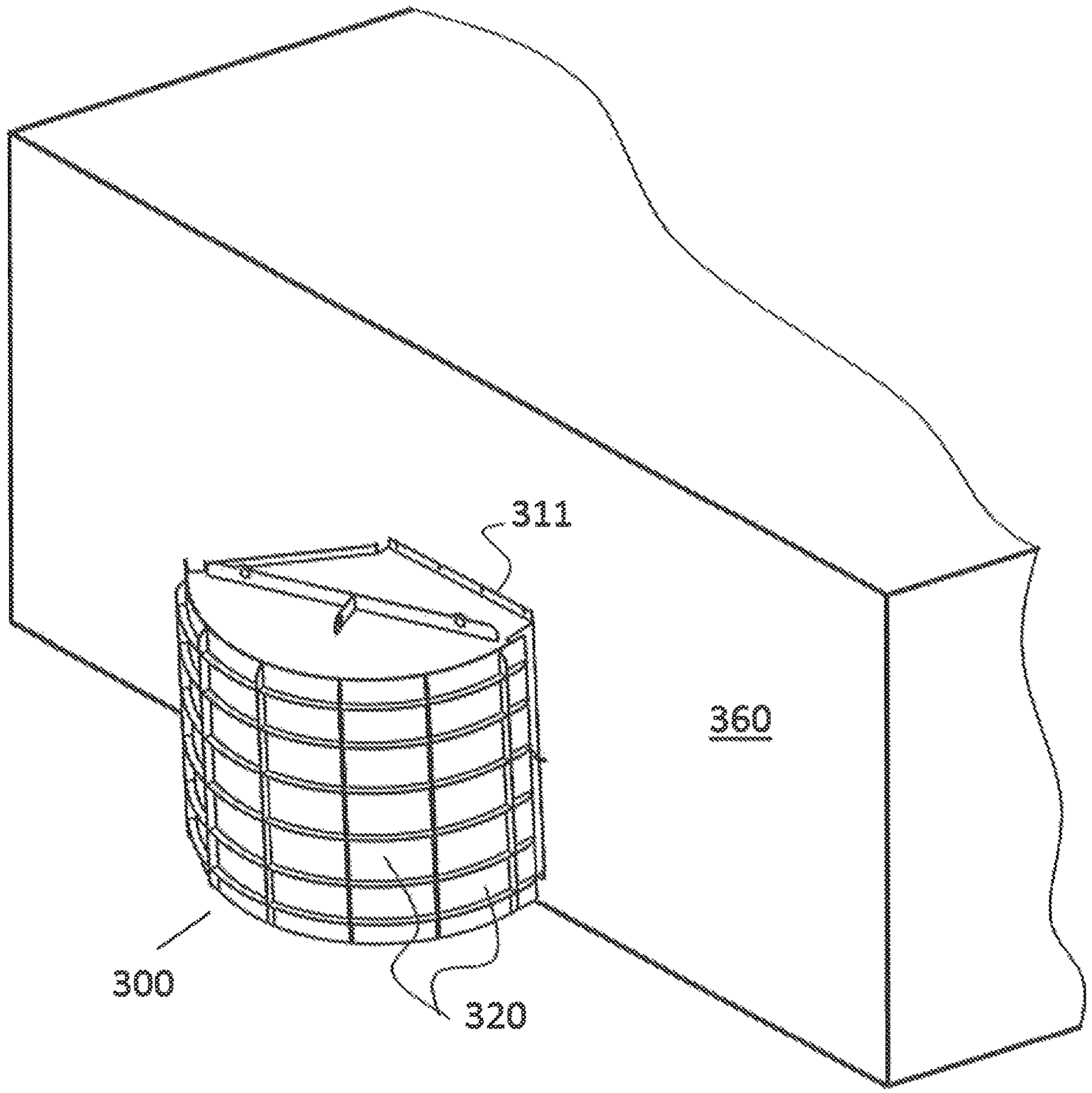
FIG. 10 is a perspective view of the flameless venting system of FIG. 3 mounted on a vessel.

Returning to flameless venting system 300, FIG. 10 illustrates the system 300 installed on a vessel 360 containing a protected volume. The system 300 is mounted on the vessel 360 via flanges 311. In one embodiment, prior to installation of a flameless venting system 300, the system may be provided with a tag/specification, which may be used to ensure that the system matches the mounting flange size and type. An incorrect flange may affect explosion vent performance. Exemplary embodiments of a flameless venting system may be exhibit the characteristics presented in the following table:

| Nominal panel Size | Nominal panel area | Weight | Fixing Bolts |
|---|---|---|---|
| 170 470 mm/ 7 × 19 inch | 0.0785 $m^2$/ 0.846 sq feet | 62 kg/137 lbs | Qty: 20 M10 × 30 (or imperial equivalent) |
| 270 × 458 mm/ 11 × 18 inch | 0.1220 $m^2$/ 1.315 sq feet | 85 kg/188 lbs | Qty: 22 M10 × 30 (or imperial equivalent) |
| 300 × 500 mm/ 12 × 20 inch | 0.1480 $m^2$/ 1.597 sq feet | 105 kg/232 lbs | Qty: 24 M10 × 30 (or imperial equivalent) |
| 305 × 610 mm/ 12 × 24 inch | 0.1840 $m^2$/ 1.980 sq feet | 115 kg/254 lbs | Qty: 26 M10 × 30 (or imperial equivalent) |
| 350 × 650 mm/ 14 × 26 inch | 0.2250 $m^2$/ 2.427 sq feet | 125 kg/276 lbs | Qty: 26 M10 × 30 (or imperial equivalent) |
| 490 × 590 mm/ 19 × 23 inch | 0.2870 $m^2$/ 3.088 sq feet | 145 kg/320 lbs | Qty: 32 M10 × 30 (or imperial equivalent) |
| 610 × 610 mm/ 24 × 24 inch | 0.3695 $m^2$/ 3.975 sq feet | 160 kg/353 lbs | Qty: 32 M10 × 30 (or imperial equivalent) |
| 586 × 920 mm/ 23 × 36 inch | 0.5360 $m^2$/ 5.770 sq feet | 170 kg/375 lbs | Qty: 42 M10 × 30 (or imperial equivalent) |

In the event of an explosion in the system 300, an explosion vent (not shown in FIG. 10) may open, allowing one or more of pressure, gas, dust, or flame, e.g., to reach the filter 320 covering the outlet of the quenching module body 310. As illustrated in FIG. 10, the outlet of a flameless venting system may be covered with a cover, as discussed in more detail below in connection with FIG. 11.

A flameless venting system 300 may be suitable for use in applications such as bucket elevators, dust collectors, bins, or other applications in which a protected volume poses a risk of ignition. A flameless venting system 300 also may be suited for use with cyclones, bag houses, cartridge filters, pneumatic conveying systems, milling processes (including pin milling, ball milling, etc.), dryers, ovens, roller mills, grinding applications, and buildings.

In operation, a flameless venting system may reach high temperatures and may exhaust high-temperature gas or other materials through the filter. Thus, it may be necessary or desirable to create a "safety zone" within a certain distance from the quenching module. Personnel, flammable materials, and/or temperature-sensitive equipment may be restricted outside of the safety zone during operation, to avoid the risk of injury, damage, or fire during operations that may lead to an explosion being quenched in the quenching module. The size of any required safety zone may be decreased by using protection shields or other mechanisms (not shown) placed between the outlet of system 300 and personnel or sensitive materials or equipment. In one embodiment, the operation of a quenching module may be improved by maintaining a distance between the quenching module and any walls or nearby equipment, so that venting through the filter is not obstructed.

Figure 11:
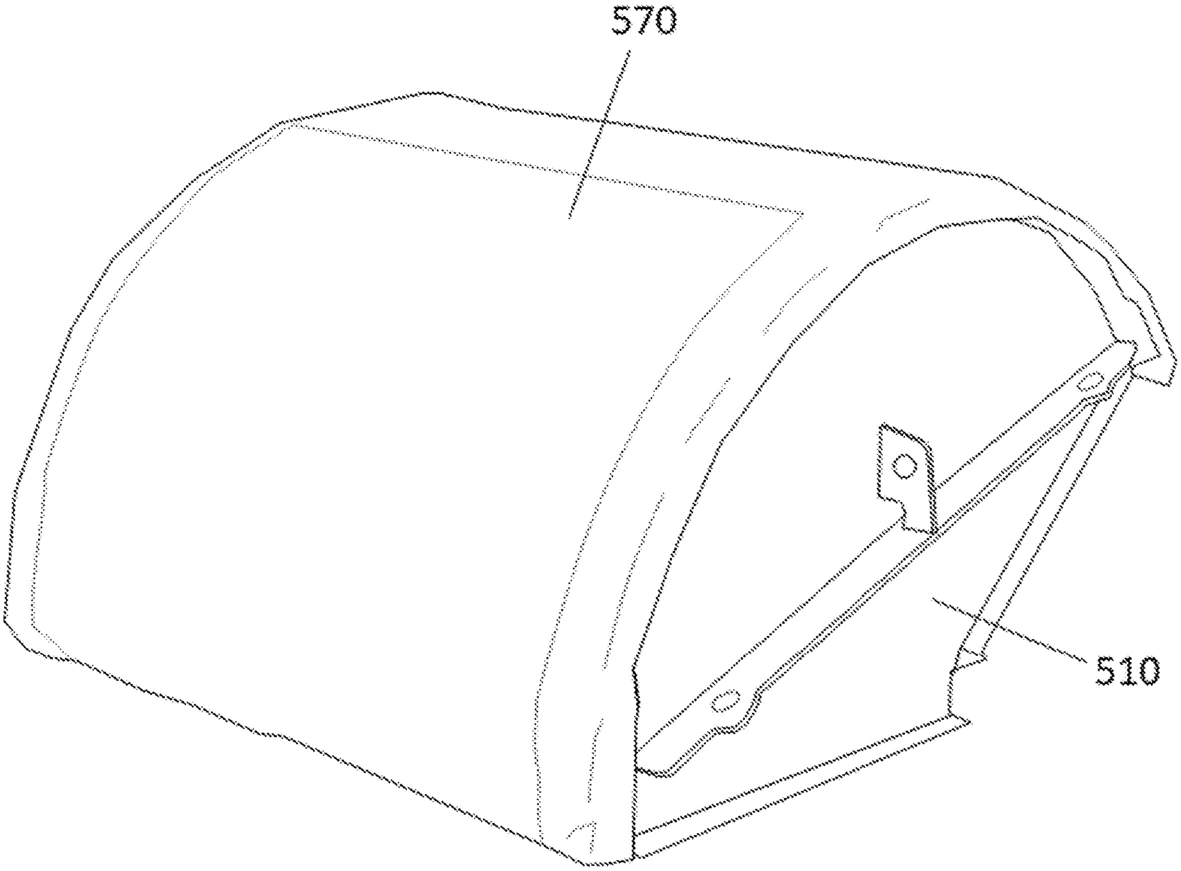
FIG. 11 is a perspective view of the flameless venting system of FIG. 3, including a covering member.

FIG. 11 depicts another embodiment of a flameless venting system 500. In one embodiment, all or part of a quenching module body 510 may be covered with a cover 570. Specifically as illustrated in FIG. 11, a cover 570 may cover an outlet of the flameless venting system 500, including any filter and/or support members such as illustrated, e.g., in FIGS. 2, 3, 4A, and 4B. The cover 570 may be used to protect the filter or other components of a flameless venting system against damage or the accumulation of dust. Damage or accumulated dust may hinder the filter's performance or may create a safety hazard (e.g., if the dust or other accumulated materials are flammable). In one embodiment, the cover 570 may be rigid or semi-rigid, and may thus provide impact protection to the filter. The cover 570 may be designed to rupture in the event of an explosion, to allow filtered pressure and gases to exit the flameless venting system 500 through the filter.

FIG. 12 and FIG. 13 provide additional detail of a sensor 340 (also illustrated in FIG. 3), which may be used to monitor the opening of an explosion panel 351 in a flameless venting system. As illustrated in FIG. 12, a sensor mount 341 may be provided on the body 310 of a flameless venting system and may extend from the exterior of the body (FIG. 12) into the interior of the body (FIG. 13) to place the sensor 340 in a position, adjacent flange 352, to monitor the opening of the panel 351. As illustrated, the sensor 340 is a physical sensor that will be triggered when it contacts a panel 351 or panel bracket 359 in the process of opening under pressure or vacuum. For example, the sensor 340 may be a burst sensor, which may be a polytetrafluoroethylene (PTFE) burst sensor designed to inform the user (or an automatic monitoring system) of opening. The sensor 340 may be used to trigger an alarm, or to stop the process feed of material that may exacerbate or perhaps be harmed by an explosion, flame, or other condition. Other sensors are contemplated, including optical sensors, frangible sensors, trip switches, magnetic proximity switches, inductive proximity switches or other suitable sensors. In addition, it is contemplated that a sensor may be provided to sense a condition of an explosion panel even before opening (e.g., deformation or elevated temperature), wherein the condition indicates a problem with the system or an imminent explosion. In one embodiment, a vent sensor may be provided integrally with the vent. In another embodiment, the vent sensor may use an intrinsically safe voltage system.

The present disclosure provides an advantageous method of installing a flameless venting system, such as the system embodiments described above. In one embodiment, a quenching module body (e.g., 310 in FIG. 3, FIG. 4A, FIG. 4B, and FIG. 10) may first be positioned over an opening in a vessel (e.g., 360 in FIG. 10) containing a protected volume. The quenching module body may be lifted into place using, e.g., a shackle and lifting gear attached to lifting lugs (314, FIG. 3) provided on either side of the body 310. A mounting flange 311 on the quenching module body may be aligned with a corresponding flange on the vessel, and then secured to the vessel. In one embodiment, the mated flanges may be bolted together. In another embodiment, the mated flanges may be clamped, welded, or adhered together. The mounting flange on the quenching module body may extend outwardly from the body, as illustrated, for example, in FIG. 3, FIG. 5, and FIG. 6. Additionally or alternatively, a mounting flange on the body may extend inwardly, toward the interior of the quenching module body.

A sealing gasket may be provided between mated flanges to provide seal(s) between one or more of the explosion vent, vessel, and quenching module body. A gasket may be a separate component, or may be provided integrally with the vent, vessel, and/or quenching module body. A suitable gasket may be made, e.g., from EPDM, silicone, or other suitable materials.

Figures 14A, 14B:
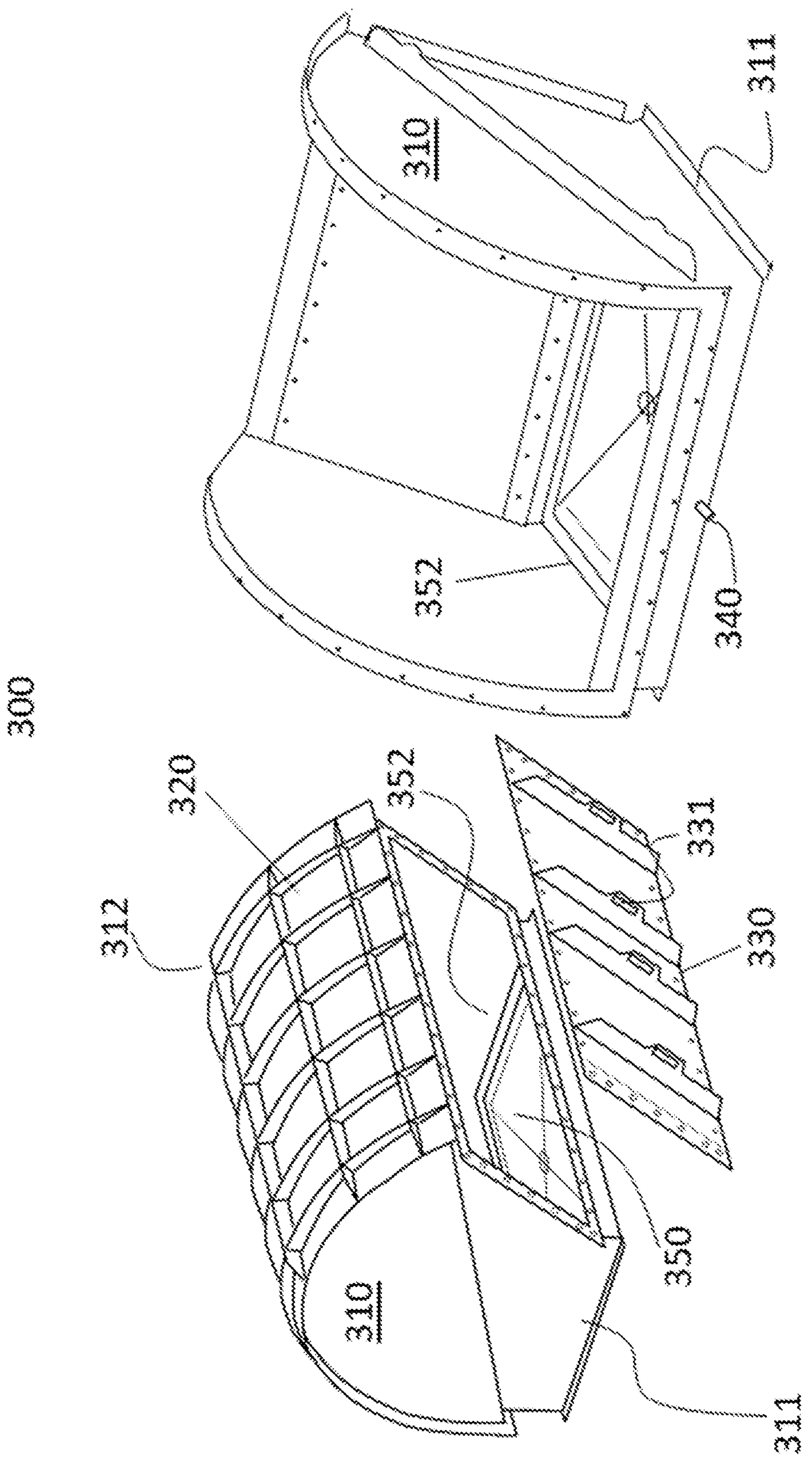
FIG. 14A is a partial perspective view of the flameless venting system of FIG. 3 from the rear, illustrating the removal of a rear hatch.
FIG. 14B is a partial perspective view of the flameless venting system of FIG. 3 from the front, illustrating the quenching module body with the filter and supports removed.

After the quenching module body 310 is fixed to the vessel, an explosion panel 350 (or burst panel or other pressure relief device) may be installed to cover the vessel opening. The vessel opening may be accessed, as illustrated in FIG. 14A, by opening a hatch 330 at the rear of the quenching module body. Handles 331 on the hatch 330 may be provided for this purpose. Alternatively, the vessel opening may be accessed by removing the filter 320 covering the outlet of the quenching module body 310 (as illustrated in FIG. 14B). If the filter 320 is supported by one or more supports 312, the supports 312 also may be removed to provide access to the vessel opening.

Once the vessel opening is accessed, an explosion panel 350 may be secured within the quenching module, as illustrated in FIG. 14A and FIG. 14B. In one embodiment, illustrated in FIG. 14A and FIG. 14B, the explosion panel may have a flange (352), which may be joined to a mated flange on the vessel. In another embodiment, the quenching module body may have a flange extending inward, such that the explosion panel flange may be joined to the mated flange of the quenching module body. A sealing gasket may be positioned between any such mated flanges. The explosion panel may be secured within the quenching module body (whether to the body or to the vessel) by way of bolts passing through mated holes in the flanges of the explosion panel, quenching model, and/or pressure vessel. In one embodiment, mated flanges may be clamped, welded, or adhered together.

An explosion vent sensor also may be installed and configured to provide an indication when the explosion vent opens. In one embodiment, the explosion vent sensor may be provided integrally with the explosion vent, such that the sensor is installed concurrently with the explosion panel. In another embodiment, the explosion vent sensor may be installed separately from the explosion panel. The explosion vent sensor may be connected to the explosion vent panel. Additionally or alternatively, an explosion vent sensor may be mounted on the quenching module, as illustrated, for example, in FIG. 12 and FIG. 13.

Figure 16A:
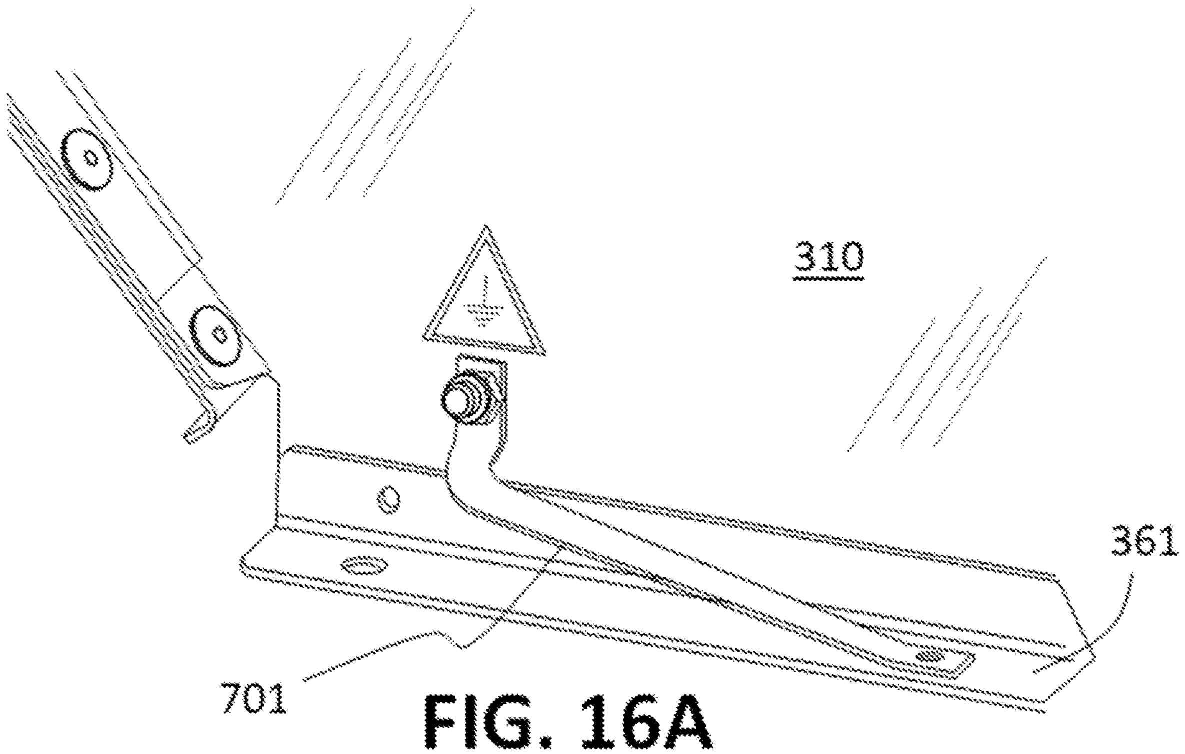
FIG. 16A illustrates a conductive grounding member.
Figure 16B:
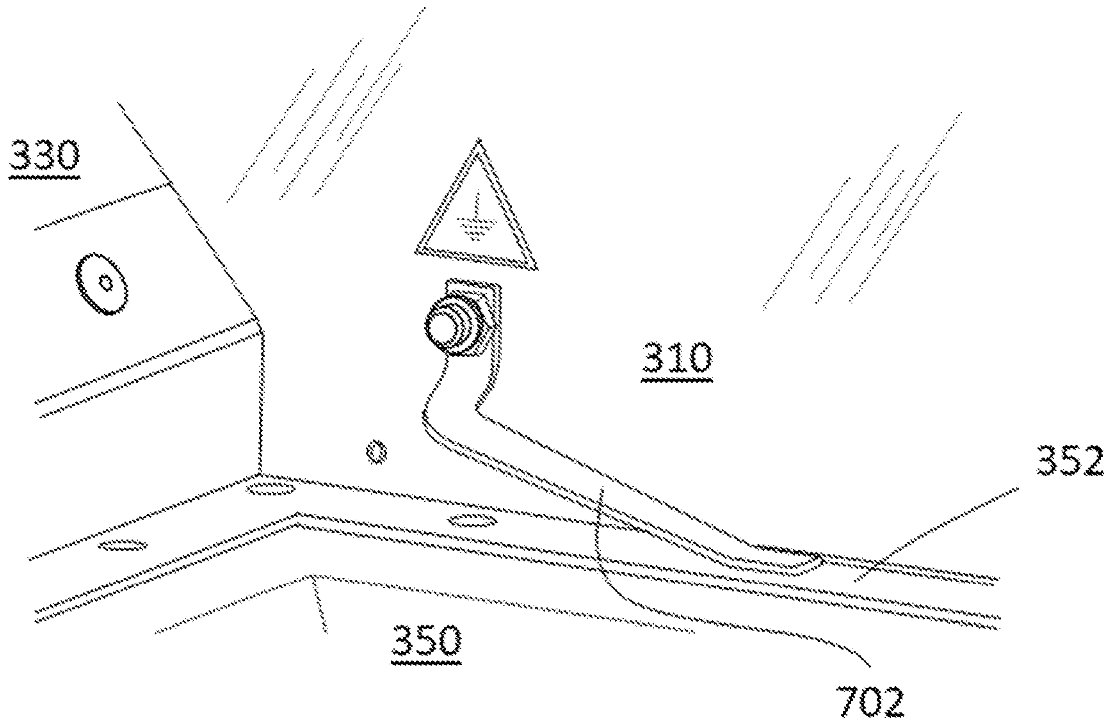
FIG. 16B illustrates another conductive grounding member.

Before operation, it may be desirable to install one or more conductive grounding straps. As illustrated in FIG. 16A, a conductive grounding strap 701 may be installed to form a conductive grounding connection between the quenching module body 310 and the vessel 361. As illustrated in FIG. 16B, a conductive grounding strap 702 may be installed to form a conductive grounding connection between the quenching module body 310 and the explosion vent 350, e.g., via explosion vent flange 352. The grounding connections may be used to prevent the build-up of static electricity (which can create an explosion in a dusty environment).

Embodiments of the disclosed flameless venting system also may be used with a method of sizing a flame quenching module of a flameless venting system. According to the method, a normal vent area requirement may first be calculated based on the needs of an application (e.g., based on the maximum anticipated pressures, particulate sizes, and other parameters). Additionally or alternatively, a normal vent area requirement may be determined by looking up known requirements for known applications. Next, a vent efficiency correction factor associated with the flameless venting system may be applied. For example, if an application is determined to require a vent area of 3 $ft^2$, and a flameless venting system has been demonstrated to have a 64% efficiency, then the necessary flameless venting system exit area size may be calculated by dividing 3 $ft^2$ by 0.64 to reach 4.69 $ft^2$. Thus, a flameless venting system having at least that exit area may be used. As another example, if an application is determined to require a vent area of 5 $ft^2$, and a flameless venting system has been demonstrated to have an 87% efficiency, then the necessary exit area for the flameless venting system may be calculated by dividing 5 $ft^2$ by 0.87 to reach 5.75 $ft^2$. In both examples, an exemplary 920 mm×586 mm flameless venting system, having a 6 $ft^2$ exit area may be used to achieve the necessary 4.69 $ft^2$ or 5.75 $ft^2$ exit areas.

Embodiments of the present disclosure have been tested and demonstrated to achieve certain performance advantages. For example, an embodiment of the disclosed flameless venting system may have significant $K_{st}$ capability, including $K_{st}$≤350. In a dust application, $K_{st}$ is the deflagration index of the dust, and is an expression of its reactivity. $K_{st}$ is a parameter critical to the sizing of all explosion venting devices, including flameless venting devices. Based on observed $K_{st}$ values, an embodiment of the disclosed vent may be used for agricultural and/or organic dusts.

The disclosed flameless venting system may achieve standards for flameless venting, including, e.g., EN 16009: 2011 (the only global standard dedicated to flameless venting devices), EN 14491-2012, EN 14797-2007, and/or NFPA 68-2007. Furthermore, the disclosed flameless venting system may be ATEX certified and/or CE marked. The disclosed venting system may meet standard INERIS 15ATEX0016X. In one embodiment, the disclosed venting system may discharge in ATEX Zone 21 & 22, on protected equipment with dust concentration up to 300 $g/m^3$ and particle size up to 50 μm.

It is contemplated that individual features of one embodiment may be added to, or substituted for, individual features of another embodiment. Accordingly, it is within the scope of this disclosure to cover embodiments resulting from substitution and replacement of different features between different embodiments.

The above described embodiments and arrangements are intended only to be exemplary of contemplated systems and methods. Other embodiments will be apparent to those skilled in the art from consideration of the specification and practice of the disclosure herein.

What is claimed is:

1. A flameless venting system for a protected enclosure having a curved surface, comprising:
- a pressure relief device configured to seal an opening in the curved surface of the vessel, the pressure relief device further configured to open in response to a predetermined pressure within the vessel;
- a flame arrestor positioned over the pressure relief device, wherein the flame arrestor has a mounting flange;
- wherein the mounting flange is curved to mate with the curved surface of the vessel.

2. A flameless venting system for a vessel, comprising:
- a quenching module configured to mount on the vessel over an opening in the vessel, the quenching module comprising:
  - a body having an inlet and an outlet;
  - a mounting flange extending along at least a portion of the inlet of the body; and
  - a filter configured to cover the outlet; and
- a pressure relief device configured to seal the opening in the vessel, wherein the pressure relief device includes a rupturable member configured to rupture in response to a predetermined pressure within the vessel, and wherein the pressure relief device includes a flange;
- wherein the pressure relief device flange is configured to be mounted within the quenching module body;
- wherein the pressure relief device is configured to release vented fluid into the body of the quenching module upon rupture; and
- wherein the quenching module is configured to remain mounted on the vessel during installation and removal of the pressure relief device.

3. The system of claim 2, wherein the pressure relief device is configured to mount on the vessel separately from the quenching module body.

4. The system of claim 2, wherein the quenching module body includes an opening to provide access to the interior of the interior of the quenching module when the quenching module is mounted on the vessel.

5. The system of claim 4, wherein the quenching module body opening is a hatch.

6. The system of claim 4, wherein the quenching module body opening is configured to permit installation and removal of the pressure relief device from the interior of the quenching module.

7. The system of claim 2, wherein the filter has a curved cross-section.

8. The system of claim 7, wherein the filter has a surface area, and wherein the surface area is at least twice as large as the area of the opening in the vessel.

9. The system of claim 7, wherein the curved cross-section is in the shape of a circular arc.

10. The system of claim 7, wherein the curved cross-section is in the shape of an elliptical arc.

11. The system of claim 2, wherein the mounting flange is curved, and wherein the mounting flange is configured to fit a curved surface of the vessel.

12. The system of claim 2, further comprising a covering member to cover the filter.

13. The system of claim 2, further comprising a sensor to sense when the pressure relief device ruptures.

14. A method of installing a flameless venting system for a vessel, comprising:

mounting a quenching module over an opening in a vessel; and mounting an explosion panel within the quenching module, such that the explosion panel seals the opening in the vessel, wherein the explosion panel is mounted after the quenching module is mounted; and configuring the explosion panel to release vented fluid into a body of the quenching module when the explosion panel explodes.

15. The method of claim 14, further comprising:

opening a hatch in the quenching module;

wherein mounting the explosion panel within the quenching module includes inserting the explosion panel through the hatch in the quenching module.

* * * * *